United States Patent
Dudhwala et al.

(10) Patent No.: US 6,516,955 B1
(45) Date of Patent: Feb. 11, 2003

(54) MODULAR CABINET FRAME

(75) Inventors: Tejal Dudhwala, Coroapolis, PA (US); Richard Trussler, McDonald, PA (US); Paul Colbaugh, Pittsburgh, PA (US); Ronald Carder, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/051,559

(22) Filed: Jan. 17, 2002

(51) Int. Cl.[7] .................................................. A47F 5/00
(52) U.S. Cl. ..................... 211/26; 211/189; 211/182; 312/265.4; 403/217; 403/170
(58) Field of Search ..................... 211/26, 182, 189; 312/265.1, 265.2, 265.3, 265.4, 265.5, 265.6; 403/217, 170

(56) References Cited

U.S. PATENT DOCUMENTS 3,919,603 A * 11/1975 Salvati et al. ............ 211/182 X
5,516,225 A * 5/1996 Kvols ......................... 403/170
5,695,263 A * 12/1997 Simon et al. ............. 312/265.4
5,820,289 A * 10/1998 Kern et al. ............... 211/182 X
5,997,117 A * 12/1999 Krietzman ................ 312/265.4
6,179,398 B1 * 1/2001 Martin .................... 403/217 X
6,223,917 B1 * 5/2001 Bruder ........................ 211/189
6,315,132 B1    11/2001 Hartel et al.

* cited by examiner

Primary Examiner—Robert W. Gibson, Jr.
(74) Attorney, Agent, or Firm—Martin J. Moran (57) ABSTRACT

An improved frame for a switchgear cabinet includes a plurality of rails that are connected together with a plurality of connectors. The rails are generally of two different cross-sectional configurations, both of which are cooperable with a single type of connector to enable the rails and connectors to be configured into numerous different types of cabinet frames to which panels can be mounted to form switchgear cabinets. The rails and connectors are modular in nature and are specifically configured to be easily connected with one another. During assembly of the connectors and the rails, portions of a coating on the rails become ruptured, thereby electrically conductively connecting together the rails and the connectors.

20 Claims, 9 Drawing Sheets

MODULAR CABINET FRAME

BACKGROUND OF THE INVENTION

1. Field of the Invention

The present invention relates generally to power distribution equipment and, more particularly, to a modular frame of a cabinet within which power distribution equipment can be disposed.

2. Description of the Related Art

As is known in the relevant art, power distribution equipment typically includes circuit breakers and other associated switchgear. In use, such equipment typically is mounted within a switchgear cabinet that is configured to physically accommodate the equipment and associated wiring. Such switchgear cabinets are additionally configured to provide a protective barrier between the switchgear within the cabinet and the technicians and other personnel working in the proximity of the exterior of the cabinet.

Previously known switchgear cabinets have typically been designed to be compatible with only a small number of different types of circuit breakers, with new switchgear cabinets needing to be designed for each new circuit breaker design. Each newly designed switchgear cabinet must undergo a rigorous safety testing regimen prior to production. The effort involved in the design and testing of each new cabinet configuration has been both costly and time consuming, thereby increasing the cost of each new line of circuit breakers as well as increasing the duration of the product development cycle. It is thus desired to provide an improved switchgear cabinet and, more particularly, a frame for a switchgear cabinet, that includes modular components which can be assembled and configured in different fashions to be compatible with different types of circuit breakers without requiring as much design or testing effort as previously known switchgear cabinetry.

SUMMARY OF THE INVENTION

In view of the foregoing, an improved frame for a switchgear cabinet includes a plurality of rails that are connected together with a plurality of connectors. The rails are generally of two different cross-sectional configurations, both of which are cooperable with a single type of connector to enable the rails and connectors to be configured into numerous different types of cabinet frames to which panels can be mounted to form switchgear cabinets. The rails and connectors are modular in nature and are specifically configured to be easily connected with one another. During assembly of the connectors and the rails, portions of a coating on the rails become ruptured, thereby electrically conductively connecting together the rails and the connectors.

Accordingly, an aspect of the present invention is to provide an improved cabinet frame that is relatively less expensive to design and test than previously known cabinet frames.

Another aspect of the present invention is to provide an improved cabinet frame that is relatively easy to assemble.

Another aspect of the present invention is to provide an improved cabinet frame that is modular in nature.

Another aspect of the present invention is to provide an improved cabinet frame that generally includes a plurality of rails and a plurality of connectors, with the rails being generally of two different cross-sections.

Another aspect of the present invention is to provide a cabinet frame assembled out of a plurality of rails and connectors, with the rails each including a coating, and with the coating being ruptured at one or more points to provide an electrically conductive connection between each rail and each associated connector.

Accordingly, an aspect of the present invention is to provide a connector for connecting together a plurality of rails to form a portion of a cabinet frame, the general nature of which can be stated as including a post and a plurality of clasping members, each clasping member being structured to be associated with one of the rails and to fasteningly extend between the associated rail and the post, each clasping member including a clip and a fastener, the clip being structured to be engageable with the associated rail, the fastener extending between the clip and the post, the clip including three engagement elements, the three engagement elements each being structured to engage the associated rail to retain the associated rail on the post, wherein a portion of the clip that extends between at least a pair of the engagement elements is structured to be disposed at least partially adjacent an outward-facing surface of the associated rail, and the fastener being generally centrally disposed between the three engagement elements.

Another aspect of the present invention is to provide a cabinet frame, the general nature of which can be stated as including a plurality of rails, each rail including an outward-facing surface, and a plurality of connectors, each connector including a post and a plurality of clasping members, each clasping member being associated with one of the rails and fasteningly extending between the associated rail and the post, each clasping member including a clip and a fastener, the clip being engaged with the associated rail, the fastener extending between the clip and the post, the clip including a first engagement element, a second engagement element, and a third engagement element that are each engaged with the associated rail to retain the associated rail on the post, wherein a portion of the clip that extends between at least a pair of the engagement elements is disposed at least partially adjacent the outward-facing surface of the associated rail, and the fastener being generally centrally disposed between the three engagement elements.

Still another aspect of the present invention is to provide a cabinet frame, the general nature of which can be stated as including a plurality of rails and a plurality of connectors, each rail including a first flange and a second flange oriented substantially parallel with one another and being separated from one another by an opening in the rail that extends substantially throughout the longitudinal extent of the rail, each rail including a cavity extending substantially throughout the longitudinal extent of the rail and being in communication with the exterior of the rail through the opening in the rail, each connector including a post and a plurality of clasping members, each clasping member being associated with one of the rails fasteningly extending between the associated rail and the post, and each clasping member including a clip and a fastener, the clip being engaged with the associated rail, the fastener extending between the clip and the post, the clip including a first engagement element, a second engagement element, and a third engagement element that are each engaged with the associated rail to retain the associated rail on the post, the first engagement element being engaged with the first flange, and the second engagement element being engaged with the second flange.

BRIEF DESCRIPTION OF THE DRAWINGS

A further understanding of the invention can be gained from the following Description of the Preferred Embodiment when read in conjunction with the accompanying drawings in which.

Similar numerals refer to similar parts throughout the specification.

DESCRIPTION OF THE PREFERRED EMBODIMENT

Figure 1:
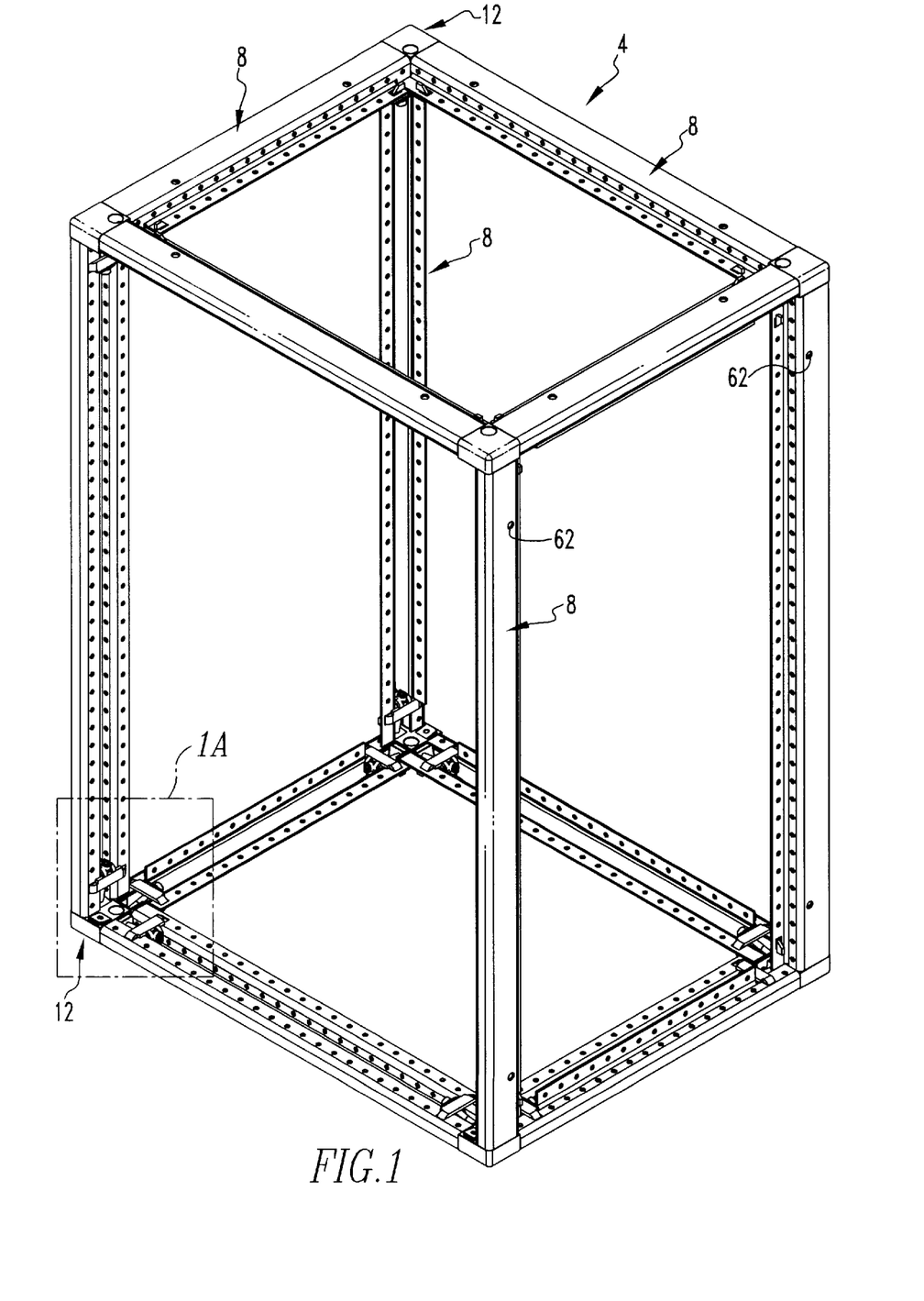
FIG. 1 is an isometric view of a cabinet frame in accordance with the present invention.
Figure 1A:
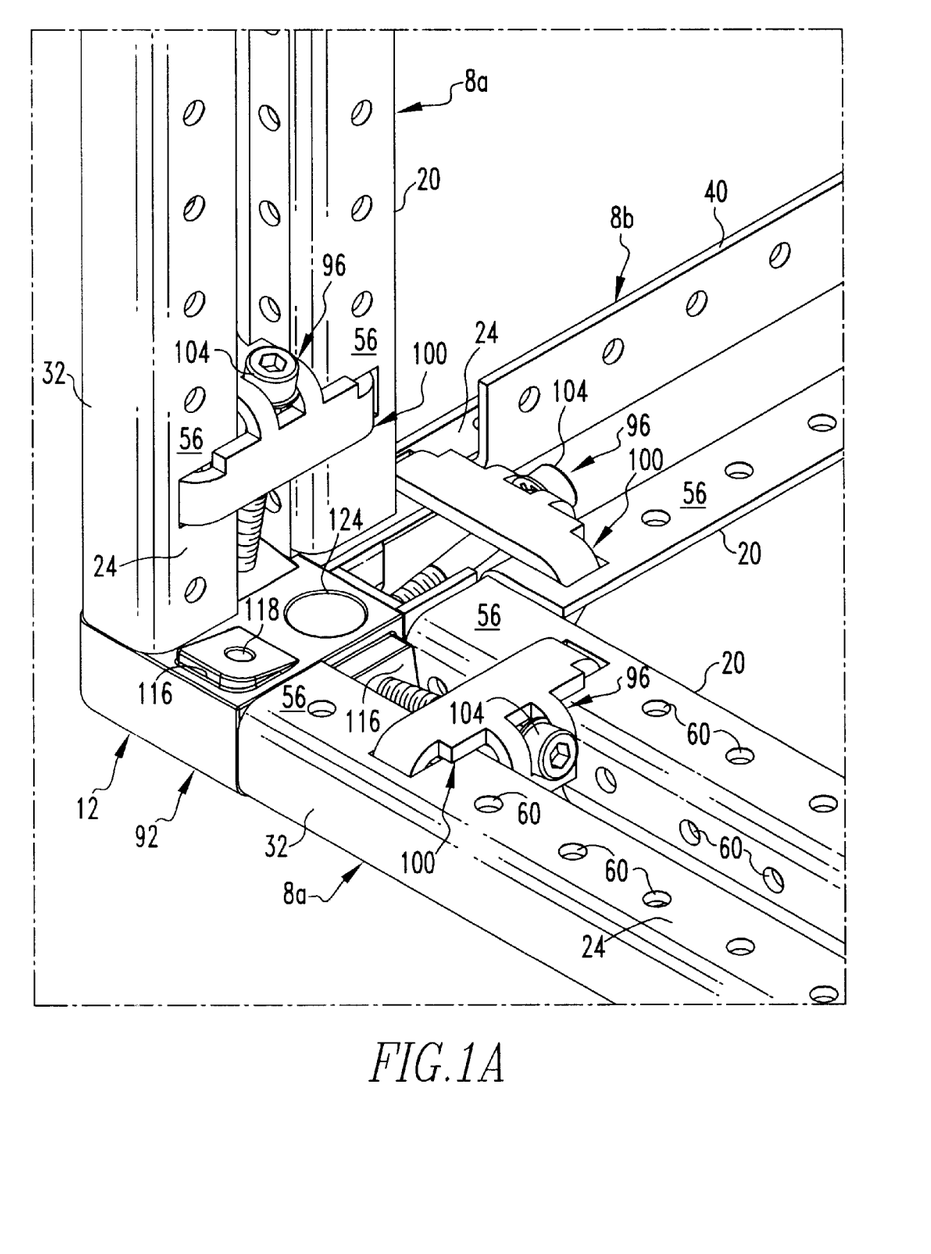
FIG. 1A is an enlarged view of a portion of FIG. 1.

A cabinet frame 4 in accordance with the present invention is indicated generally in FIG. 1. The cabinet frame 4 can be generally stated as including a plurality of rails 8 and a plurality of connectors 12 that are connected with one another. The rails 8 and the connectors 12 are generally of a modular configuration and thus can be assembled in different configurations to form numerous different types of cabinet frames. As will be set forth more fully below, the rails 8 and the connectors 12 are advantageously configured to permit the cabinet frame 4 to be easily assembled. It is understood that the cabinet frame 4 depicted generally in FIG. 1 is an example of one such cabinet frame, and that other cabinet frames of different configurations can be assembled out of the same rails 8 and connectors 12.

Figure 3:
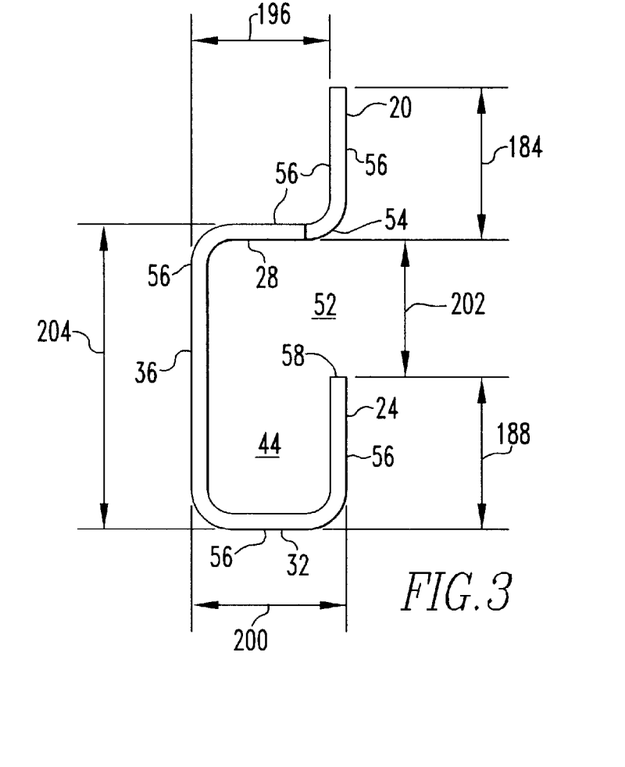
FIG. 3 is an end view of a first rail of the present invention.
Figure 4:
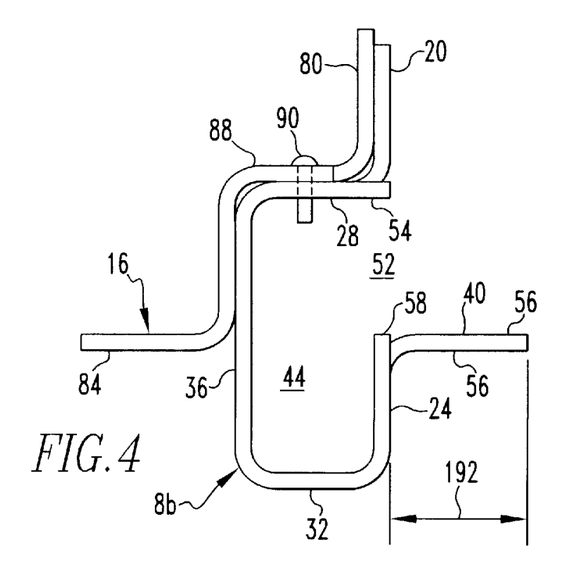
FIG. 4 is an end view of a second rail and an auxiliary flange member of the present invention.
Figure 5:
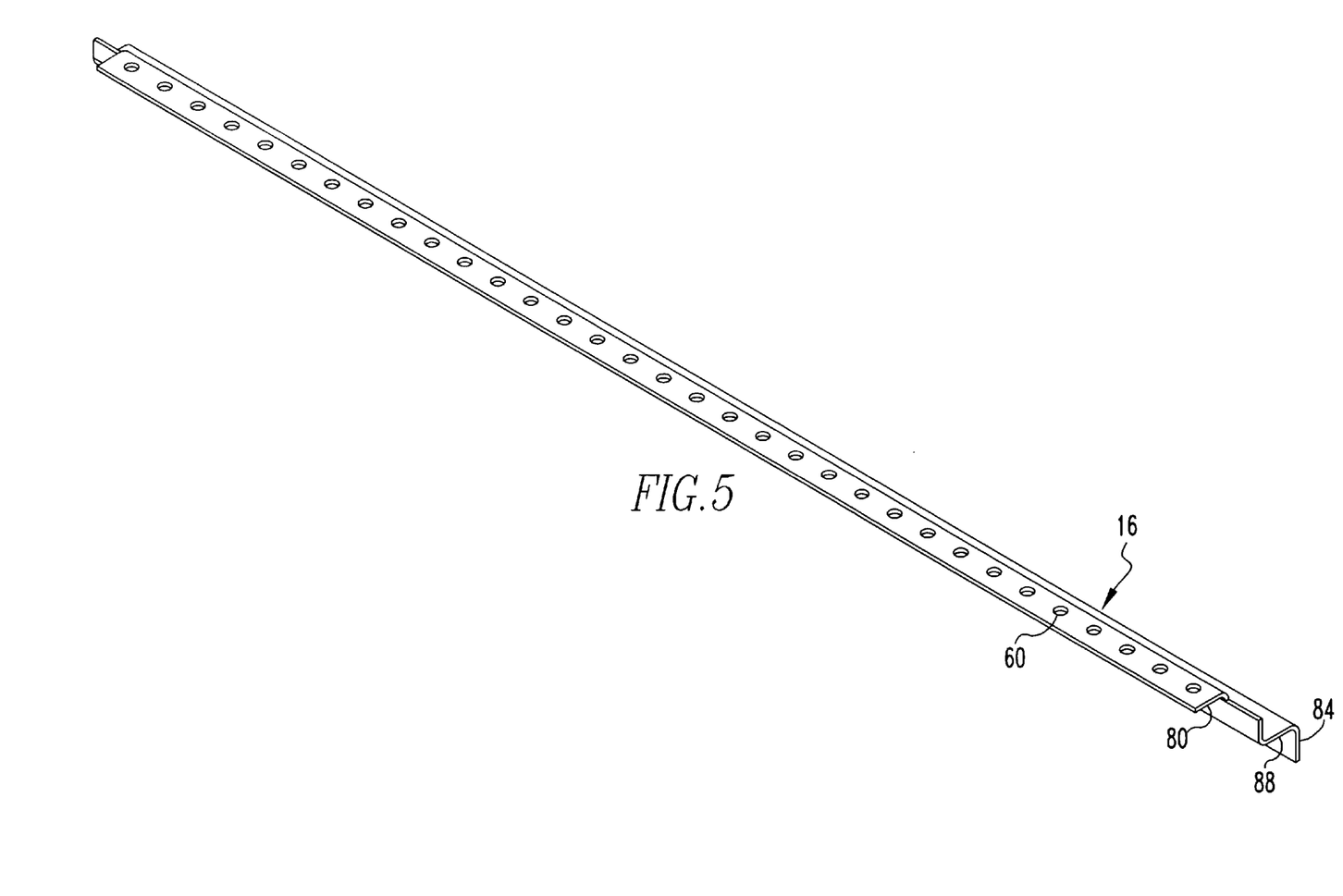
FIG. 5 is an isometric view of the auxiliary flange member.

The connectors 12 are depicted herein as being generally of only a single configuration, although it is understood that the connectors 12 may be of other configurations depending upon the specific needs of the particular application. As can be understood from FIGS. 2, 3, and 4, however, the rails 8 are generally of two different cross-sections such that each of the rails 8 is either a first rail 8a (FIG. 3) or a second rail 8b (FIG. 4). It is to be noted that the second rail 8b depicted in FIG. 4 includes an auxiliary flange member 16 mounted thereon that could alternatively or additionally be mounted on the first rail 8a.

The first and second rails 8a and 8b are similar to one another, with the second rail 8b including an additional flange that is absent from the first rail 8a. The first and second rails 8a and 8b can be employed in the cabinet frame 4 in various combinations depending upon the desired final configuration of the cabinet frame 4. Additionally, and as will be set forth more fully below, the auxiliary flange member 16 is an optional structure that can be employed depending upon the specific needs of the particular application and can be mounted on either of the first and second rails 8a and 8b.

As can be understood from FIGS. 3 and 4, each of the first and second rails 8a and 8b include a first flange 20, a second flange 24, a first leg 28, a second leg 32, and a base 36, with the second rails 8b each additionally including a third flange 40. It can be seen that the first and second legs 28 and 32 are generally parallel with one another and extend from opposite edges of the base 36. The first flange 20 extends perpendicularly from an edge of the first leg 28 opposite the base 36, and the second flange 24 extends perpendicularly from an edge of the second leg 32 opposite the base 36. It can be seen that the first and second flanges 20 and 24 are substantially parallel and coplanar with one another. The rails 8 each terminate at a pair of opposite ends 68.

The first leg 28, the base 36, the second leg 32, and the second flange 24 together define a roughly rectangular cavity 44 that extends substantially throughout the longitudinal extent of each rail 8a and 8b. The cavity 44 at least partially defines a receptacle 48 that can receive at least a portion of one of the connectors 12 therein.

With the cavity 44 being defined as being the interior of the rails 8a and 8b, it can be seen from FIGS. 3 and 4 that the cavity 44 is in communication with an exterior of the rails 8a and 8b through an opening 52 that is interposed between the first and second flanges 20 and 24 and that extends substantially throughout the longitudinal extent of the rails 8a and 8b. It can also be seen that the first flange 20 includes a first longitudinal edge 54 disposed adjacent the opening 52 and that the second flange 24 includes a second longitudinal edge 58 disposed adjacent the opening 52. As will be set forth more below, by configuring the first and second rails 8a and 8b to include the opening 52, the connectors 12 advantageously can be readily connected with the rails 8a and 8b due to the generally open configuration thereof.

It can be seen from FIG. 4 that the third flange 40 extends perpendicularly from the second longitudinal edge 58 of the second flange 24 of the second rail 8b, with the third flange 40 extending from the second flange 24 in a direction generally away from the cavity 44. As can be understood from FIGS. 1 and 2, the third flange 40 generally does not extend fully throughout the longitudinal extent of the second rails 8b, but rather terminates short of the opposite ends 68 of the second rails 8b in order to avoid interference with portions of other rails 8 oriented perpendicular thereto at the connectors 12. It will be further understood that end portions of one or more of the first and second flanges 20 and 24, the first and second legs 28 and 32, and the base 36 may be similarly foreshortened at the ends 68 of the rails 8a and 8b, or at other regions thereof, in order to similarly avoid interference with other structures, although this is not specifically shown in the accompanying drawings. It is understood that such foreshortening may be necessary depending upon the specific configuration of the desired final cabinet frame.

With the cavity 44 again being defined as being the interior of the rails 8a and 8b, each of the first leg 28, the base 36, the second leg 32, and the second flange 24 include an outward-facing surface 56 (FIGS. 1A, 3, 4, 6, and 7) that faces in a direction other than toward the cavity 44. In this regard, it can further be seen that the first flange 20 and the third flange 40 each include a pair of opposed outward-facing surfaces 56 since the first and third flanges 20 and 40 are not disposed adjacent the cavity 44, but rather are structures which generally protrude outwardly and away from the cavity 44.

It can be, seen that the first, second, and third flanges 20, 24, and 40, and preferably also the first and second legs 28 and 32, include a plurality of regularly spaced substantially circular holes 60 (FIGS. 1A, 6, and 7) formed therein. The holes 60 are, in the present embodiment, configured to be non-threaded in order to cooperatively receive self-tapping screws or other such fasteners therein, as appropriate, for fastening various structures to the first and second rails 8a and 8b. As can be understood from FIG. 1, the base 36 of one or more of the rails 8 may be formed with one or more connection bores 62 (FIG. 1) that can be used for connecting the cabinet frame 4 with another adjacent cabinet frame 4 or other structure with appropriate fasteners.

The first and second flanges 20 and 24 each additionally include a pair of generally rectangular apertures 64 formed therein, with each aperature 64 being disposed adjacent but spaced slightly from one of the ends 68 of each rail 8a and 8b. Each aperture 64 defines a seat 72 on the rail 8 that is cooperable with a portion of one of the connectors 12, as will be set forth more fully below.

Each rail 8 includes a coating 76 (FIGS. 6 and 7) such as a layer of paint or other such coating on each surface that is exposed to the atmosphere. The coating 76 may be configured to enhance aesthetics, to resist corrosion, for other purposes, or a combination of such purposes.

As is shown generally in FIG. 4, the auxiliary flange member 16 includes a generally planar first plate 80, a generally planar second plate 84, and a generally V-shaped junction member 88 interposed therebetween such that the auxiliary flange member 16 is generally W-shaped in cross section. The first and second plates 80 and 84 are oriented substantially perpendicular to one another and each include a plurality of the holes 60 formed therein. The auxiliary flange member 16 advantageously can be mounted on either of the rails 8a and 8b in order to provide an additional flange if needed, depending upon the specific needs of the particular application. As can be understood from FIG. 4, the auxiliary flange member 16 is connected with the second rail 8b with a plurality of fastening members 90 that fasteningly extend through pairs of aligned holes 60 formed in the auxiliary flange member 16 and the second rail 8b. The fastening members 90 may be self-tapping screws, as suggested above, or may be other appropriate types of fasteners such as rivets, bolts, and the like.

With the auxiliary flange member 16 being mounted on the second rail 8b as depicted generally in FIG. 4, the second plate 84 of the auxiliary flange member 16 provides an additional flange that is generally coplanar with and parallel with the third flange 40, albeit disposed on an opposite side of the second rail 8b. It can be seen that the junction member 80 is configured to extend around the outward-facing surfaces 56 of the first leg 28 and the base 36. It is understood, however, that the first plate 80 can be mounted on either of the first and third flanges 20 and 40, and potentially may alternately be mounted on any of the second flange 24, the first leg 28, and the second leg 32, depending upon the desired final configuration of the cabinet frame.

Each connector 12 includes a post 92 and three clasping members 96 that are cooperable with the post 92. Each clasping member 96 includes a clip 100 and a fastener 104. It can be understood from FIG. 2 that each clip 100 is cooperable with one of the rails 8, and that each fastener 104 is cooperable with one of the clips 100, whereby each post 92 can have three of the rails 8 securely connected thereto and oriented mutually perpendicular to one another.

The post 92 includes a body 106 and three protrusions 108 extending outwardly from the body 106 in mutually perpendicular directions therefrom. Each protrusion 108 includes a boss 112 and at least one fastener plate 116, with the boss 112 protruding outwardly from the body 106 by a greater distance than the corresponding fastener plate 116. Each fastener plate 116 includes a fastener bore 118 formed therein that is cooperable with the fastener 104. The body 106 includes an attachment bore 124 formed therein and extending therethrough for purposes of enabling attachment of the post 92 to another structure as needed. It can be seen that the protrusion 108 which extends away from the body 106 in a direction generally parallel with the attachment bore 124 includes a pair of the fastener plates 116, with a channel 120 being formed between each such fastener plate 116 and the boss 112.

Figure 2:
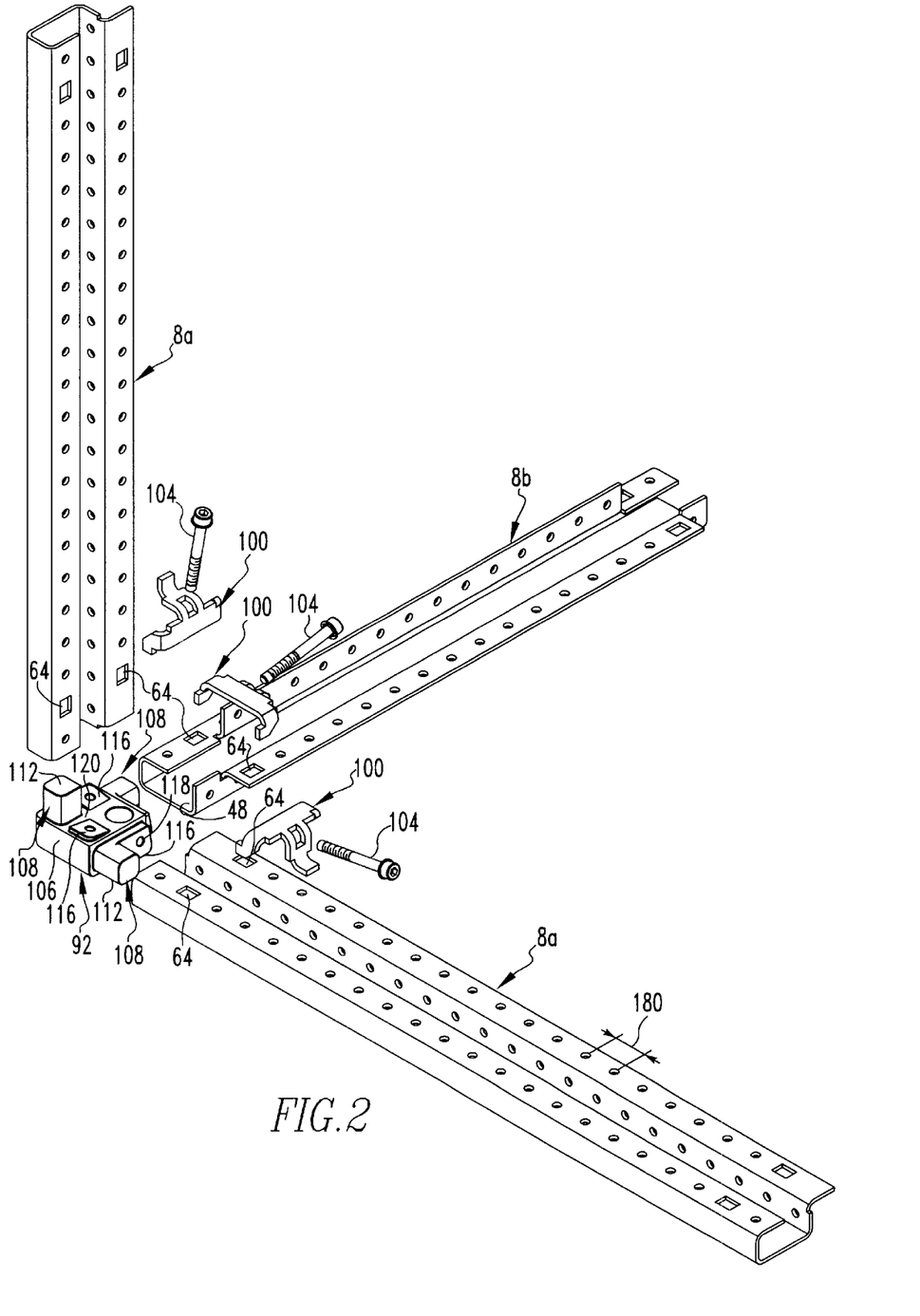
FIG. 2 is an exploded view of a portion of the present invention.
Figure 2A:
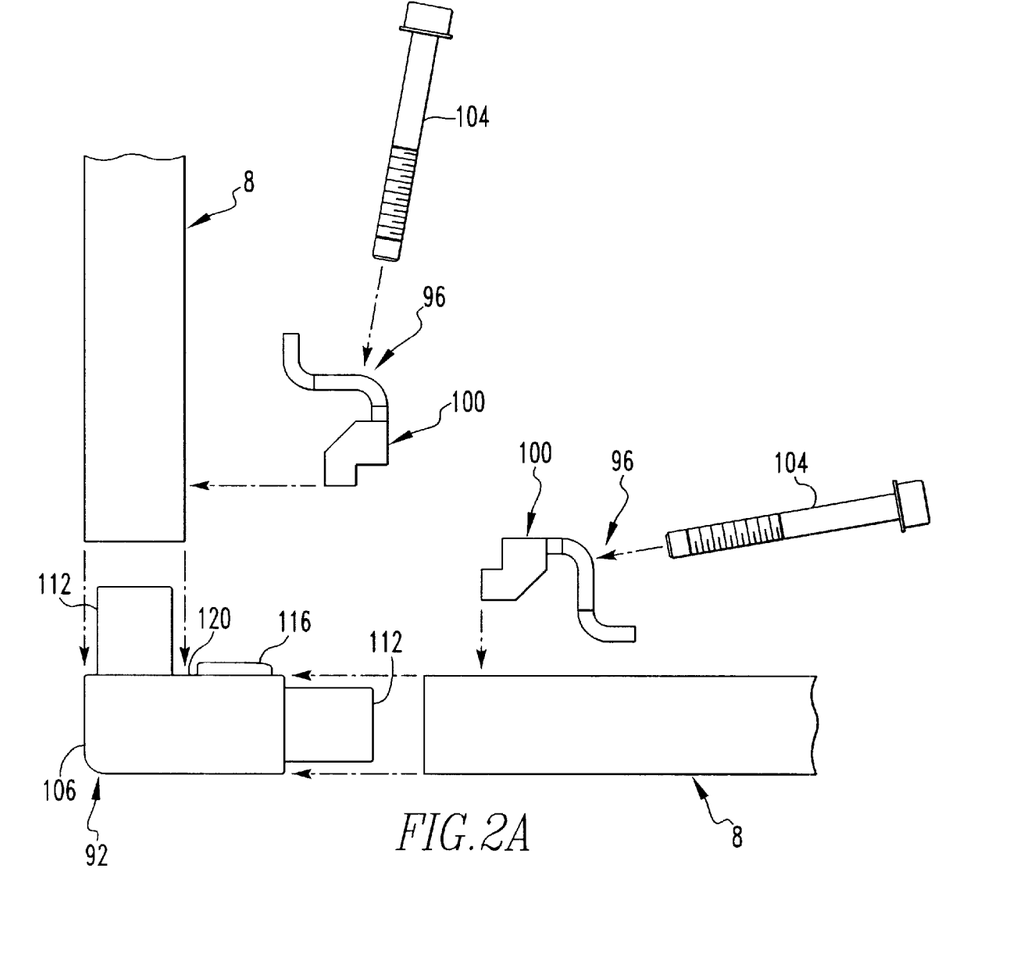
FIG. 2A is an exploded view of a portion of the present invention.
Figure 6:
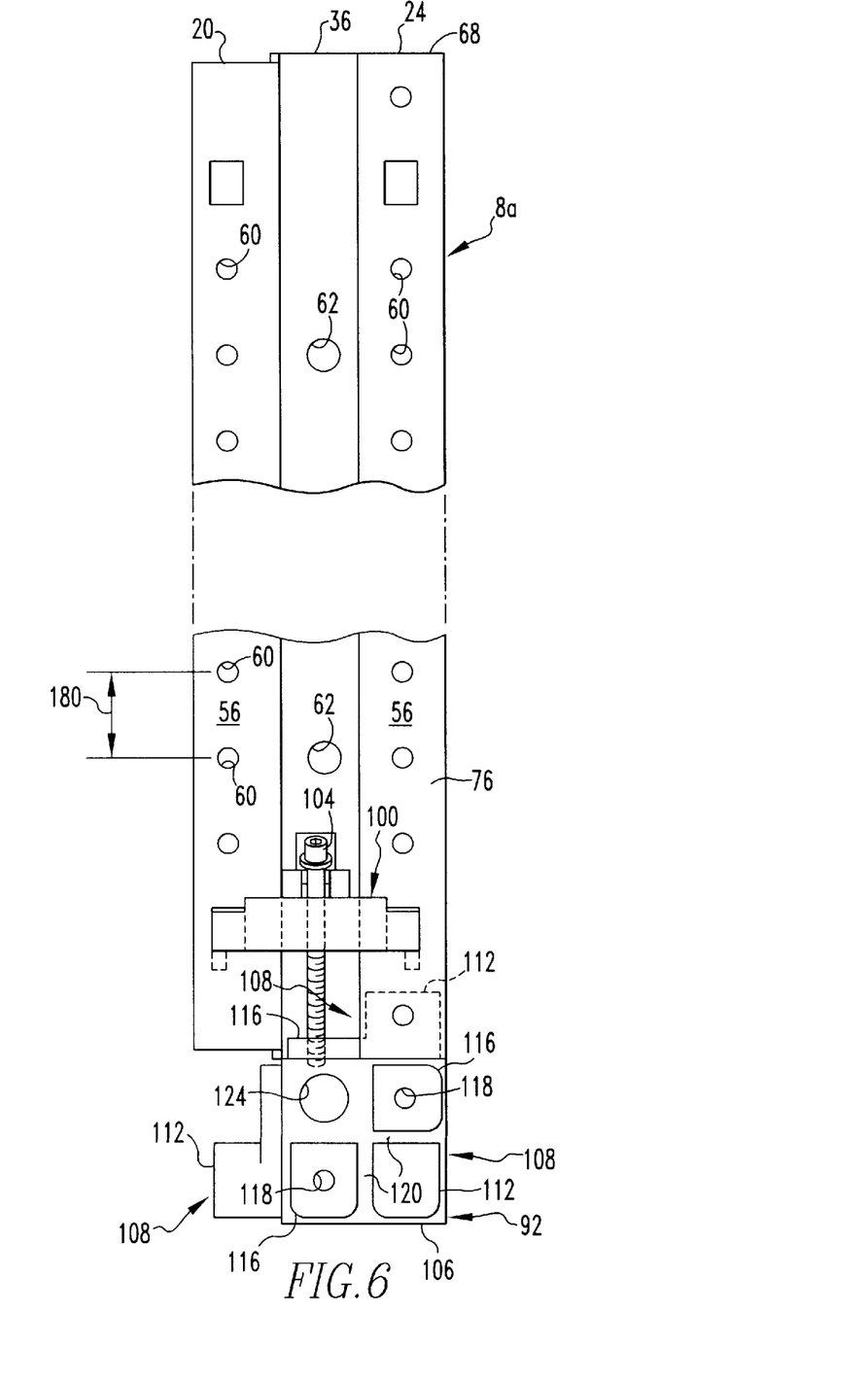
FIG. 6 is a plan view of a portion of the present invention.
Figure 7:
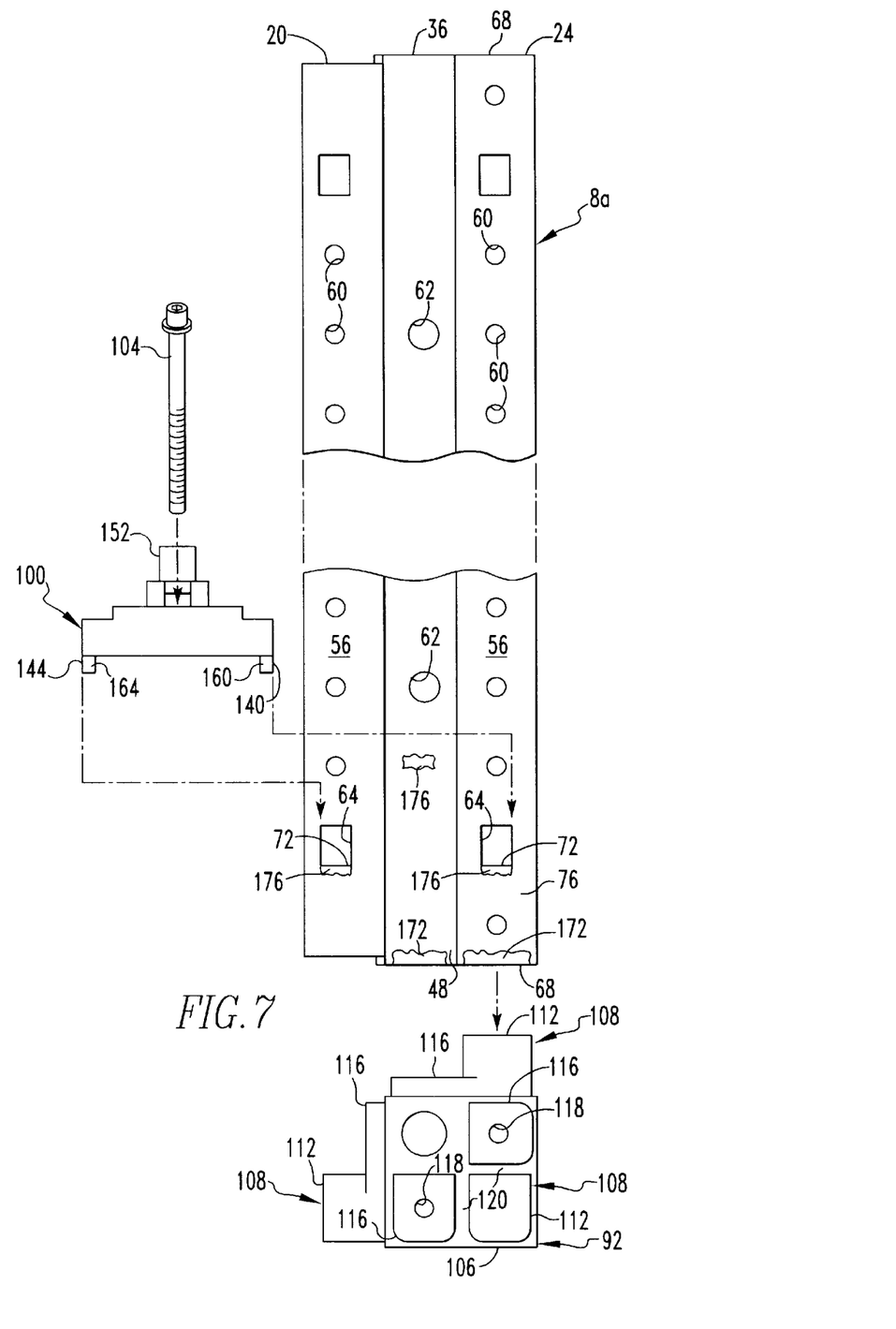
FIG. 7 is a view similar to FIG. 6, except being in an exploded configuration subsequent to initial assembly.

As can be understood from FIGS. 2, 6, and 7, the protrusions 108 are receivable in the receptacles 48 of the rails 8. In the case of the protrusion 108 that includes a pair of the fastener plates 116, it can be understood that the boss 112 and only one of the fastener plates 116 will be received in one of the receptacles 48 at any one time, with the additional fastener plate 116 and the channels 120 being provided to enable the rails 8 to be connectable in alternate orientations with the particular protrusion 108. While not being particularly depicted in the accompanying figures, it can be understood that the bosses 112 and the fastener plates 116 are snugly receivable in the receptacles 48 in order to rotationally and transversely align the rails 8 with the protrusions 108 and with the post 92.

As can be understood from FIG. 2, the fasteners 104 are received in the fastener bores 118 in an orientation that is oblique to the protrusions 108 as well as to the longitudinal extent of the rails 8. As used herein, the expression "oblique" and variations thereof refers to a relative orientation that is neither perpendicular nor parallel. As will be set forth more fully below, the oblique orientation of the fasteners 104 with respect to the rails 8 securely engages the clips 100 with the rails 8 and securely retains the rails 8 in desirable positions with respect to the posts 92.

As can be understood in FIGS. 6–9, each clip 100 includes a transverse portion 128 and a longitudinal portion 132 connected with one another. The transverse portion 128 includes a transverse shank 136, a first engagement element 140, and a second engagement element 144, with the first and second engagement elements being disposed at opposite ends of the transverse shank 136 and extending in a direction generally perpendicular to the transverse shank 136. The longitudinal portion 132 includes a longitudinal shank 148 extending from the transverse shank 136 and a third engagement element 152 extending from the longitudinal shank 148 opposite the transverse shank 136. It can be seen that a slot 156 is formed in the longitudinal shank 148 near the third engagement element 152.

Figure 8:
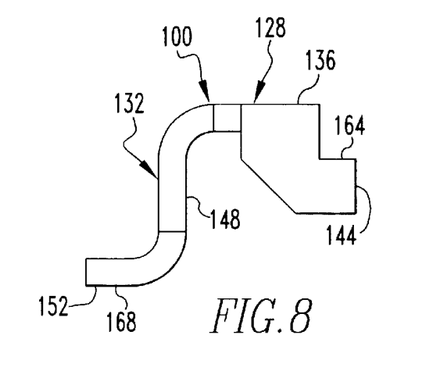
FIG. 8 is a side elevational view of a clip of the present invention.
Figure 9:
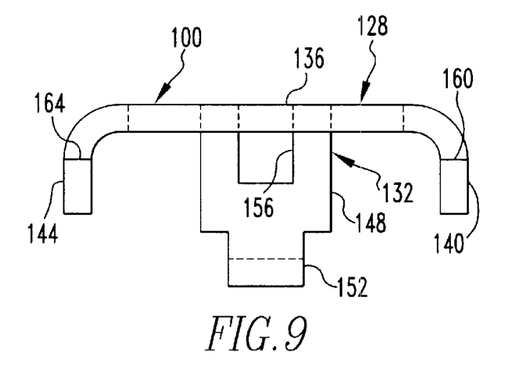
FIG. 9 is a front elevational view of the clip.
Figure 10:
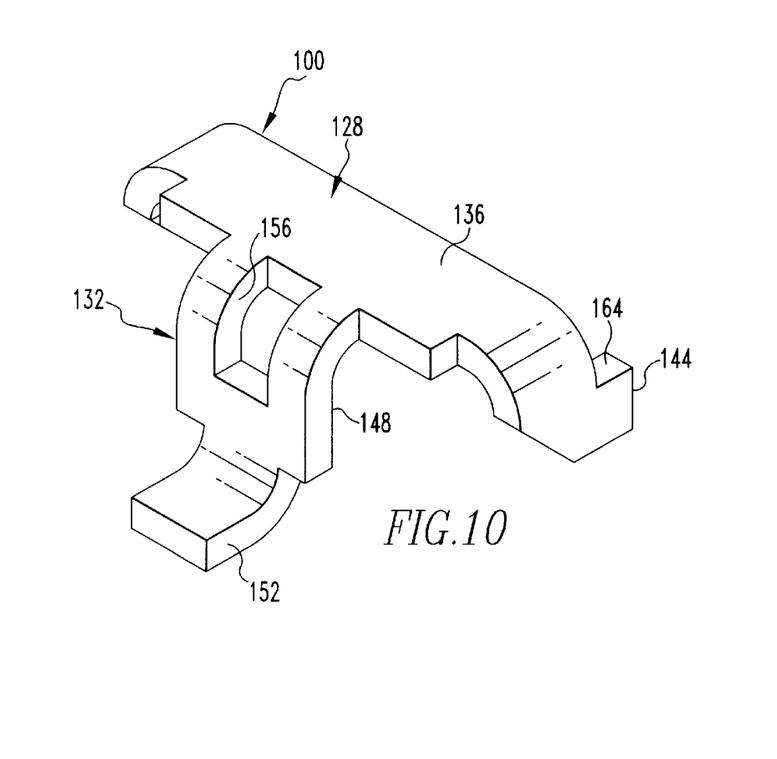
FIG. 10 is an isometric view of the clip.

It can be seen from FIG. 8 that the first and second engagement elements 140 and 144 are generally hook-shaped. The first engagement element 140 includes a first engagement surface 160, and the second engagement element 144 includes a second engagement surface 164, with both the first and second engagement surfaces 160 and 164 being generally hook-shaped. It can be seen that the third engagement element 152 includes a third engagement surface 168 that is at least partially arcuate.

The first, second, and third engagement surfaces 160, 164, and 168 of each clip 100 are engageable with one of the rails 8 to retain the rail 8 on the post 92. Specifically, the first and second engagement surfaces 160 and 164 are engageable with the seats 92 formed by the apertures 64 in the first and second flanges 20 and 24 near the ends 68. The third engagement surface 168 is received against the base 36 within the cavity 44 generally opposite the opening 52.

With the first, second, and third engagement surfaces 160, 164, and 168 engaged with one of the rails 8 as such, the fastener 104 is received through the slot 156 formed in the clip 100 and is thereafter cooperatively received in the fastener bore 118 of the fastener plate 116. If the fastener 104 and the fastener bore 118 cooperate threadably, the fastener 104 is rotated until tightened.

Since the fastener 104 is oriented oblique to the longitudinal extent of the rail 8, the tightened fastener 104 imparts force components both parallel with and perpendicular to the longitudinal extent of the rail 8. Such parallel forces cause the first and second engagement surfaces 160 and 164 to engage the seats 72. Similarly, such perpendicular forces cause the third engagement surface 168 to engage the base 36. It can also be seen that the first, second, and third engagement surfaces 160, 164, and 168 together lie within two substantially perpendicular planes, i.e., one plane being substantially parallel with the longitudinal extent of the rail 8 and the other plane being substantially perpendicular thereto. By providing the first, second, and third engagement surfaces 160, 164, and 168 within a pair of substantially perpendicular planes and by disposing the fastener 104 generally centrally among the first, second, and third engagement surfaces 160, 164, and 168, the different forces acting in different directions between the clip 100 and the rail 8 securely retain the rail 8 in a given position with respect to the post 92.

It can further be seen that the rail 8 can be relatively easily connected with the post 8 since a substantial portion of the clip 100 is disposed at the exterior of the rail 8. Specifically, it can be understood from FIGS. 1, 2, 6, and 7 that the transverse shank 136 is disposed along the outward-facing surfaces 56 of the first and second flanges 20 and 24. In this regard, the clip is attached to the rail 8 simply by receiving the first and second engagement elements 140 and 144 in the apertures 64 while the transverse shank 136 remains disposed at the exterior of the rail 8. The third engagement element 152 becomes disposed within the cavity 44 yet is disposed generally opposite the opening 52. It thus can be seen that the first, second, and third engagement surfaces 160, 164, and 168 can be engaged with the rail 8 simply by translating the clip 100 with respect to the rail 8. Further in this regard, since the fastener 104 is oriented oblique to the longitudinal extent of the rail 8, the fastener 104 can be advanced with a conventional hand tool (not shown) since the head of the fastener 104 is disposed within or very near the opening 52 and is oriented away from the rail 8.

It can be seen from FIG. 7 that each rail 8 includes a point of juncture 172 where the rail 8 contacts the body 106 of the post 92. Similarly, each rail 8 includes a point of engagement 176 at each point where one of the first, second, and third engagement surfaces 160, 164, and 168 engages the rail 8. As can be understood from FIG. 7, engagement of the clip 100 with the rail 8 causes the coating 76 to rupture at the point of juncture 172 and at the points of engagement 176, which facilitates an electrically conductive connection between the rail 8 and the connector 12 and which facilitates grounding of the cabinet frame 4. In the circumstance where the coating 76 is a layer of paint, the forces involved with engaging the clip 100 with the rail 8 cause the paint to be chipped at the point of juncture 172 and at the points of engagement 176. It is understood, however, that a rupture of the coating 76 at any of the points of engagement 176 or at the point of juncture 172 will provide the desirable electrically conductive connection between the rail 8 and the connector 12.

It thus can be seen that by mounting the rail 8 to the post 92 with the clasping member 96, the clip 100 is engaged with the rail 8, and the fastener 104 fasteningly extends between the clip 100 and the post 92. The clip 100 and the rail 8 are advantageously configured to allow the clip 100 to be readily engaged with the rail 8 after the protrusion 108 has been received in the receptacle 48. The clip 100 is moved in a first direction to be received in the apertures 64 and in the cavity 44, and upon tightening of the fastener 104 the clip is moved in a substantially perpendicular second direction to engage the seats 72 and the base 36.

By orienting the fastener 104 oblique to the longitudinal extent of the rail 8, the forces imparted to the clip 100 cause the first, second, and third engagement surfaces 160, 164, and 168 to engage the rail 8 and securely retain the position of the rail 8 on the post 92. Indeed, the fastener 104 causes the clip 100 to be wedged against the associated rail 8 in three different directions.

As can be understood from the accompanying drawings, the distance between adjacent holes 60 is substantially constant and is given by the dimension 180 (FIGS. 2 and 6). The width of the first flange 20 is given by the dimension 184 (FIG. 3), the width of the second flange 24 is given by the dimension 188, the width of the third flange 40 is given by the dimension 192, the width of the first leg 28 is given by the dimension 196, the width of the second leg 32 is given by the dimension 200, the width of the opening 52 is given by the dimension 202 and the width of the base 36 is given by the dimension 204. As can be understood from the accompanying drawings, each of the dimensions 180, 184, 188, 192, 196, 200, 202, and 204 are each equal to a multiple of a fixed characteristic length which, in the exemplary embodiment depicted in the accompanying figures, is 0.75 inches. More particularly, the dimensions 180, 184, 188, 192, 196, 200, and 202 are equal to the characteristic length and the dimension 204 is twice the characteristic length.

Such a consistency in the aforementioned dimensions facilitates and enhances the modular nature of the rails 8 and the connectors 12 by permitting cooperability between components. For instance, the cooperation of the auxiliary flange member 16 with the second rail 8b as depicted in FIG. 4 results in the second plate 84 being disposed generally centrally along the base 36 and coplanar with the third flange 40. Accordingly, by making each of the dimensions 180, 184, 188, 192, 196, 200, 202, and 204 equal to a multiple of the characteristic length, the rails 8 can be configured in myriad ways to construct myriad different types of cabinet frames. It is understood, however, that the characteristic length can be any of a wide variety of fixed dimensions that are appropriate to specific needs of particular applications. It is further understood that sheet material from which the rails 8 are manufactured has a thickness, and thus some of the aforementioned dimensions may be measured from various surfaces or edges of the rails 8, while other dimensions may be measured from other positions with respect to the rails 8.

The rails 8 are also advantageously configured to be manufactured with conventional machinery found in most any factory or machine shop. Since the rails 8 of the present invention generally include a plurality of bends and holes formed in a flat sheet, and since the bends can be formed with conventional bending machinery, such as a box and pan brake, the rails 8 can be manufactured in diverse geographic locations using conventional equipment that is relatively inexpensive to purchase and maintain and that is generally available.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A connector for connecting together a plurality of rails to form a portion of a cabinet frame, the connector comprising:

a post; and a plurality of clasping members;

each clasping member being structured to be associated with one of the rails and to fasteningly extend between the associated rail and the post;

each clasping member including a clip and a fastener;

the clip being structured to be engageable with the associated rail;

the fastener extending between the clip and the post;

the clip including three engagement elements;

the three engagement elements each being structured to engage the associated rail to retain the associated rail on the post;

wherein a portion of the clip that extends between at least a pair of the engagement elements is structured to be disposed at least partially adjacent an outward-facing surface of the associated rail; and the fastener being generally centrally disposed between the three engagement elements.

2. The connector as set forth in claim 1, in which each engagement element includes an engagement surface;

and in which the engagement surfaces of each clip together are oriented so as to be disposed at least partially in a pair of generally perpendicular planes.

3. The connector as set forth in claim 2, in which at least one of the engagement elements of each clip is generally hook-shaped; and in which the engagement surface thereof is hook-shaped.

4. The connector as set forth in claim 1, in which the post includes a plurality of protrusions extending outwardly therefrom;

the protrusions being structured to be at least partially received in receptacles formed in the rails; and in which the fasteners are oriented oblique to the protrusions;

whereby the clips are each structured to apply in two substantially perpendicular directions forces transmitted to the clips from the fasteners.

5. A cabinet frame comprising:

a plurality of rails, each rail including an outward-facing surface; and a plurality of connectors;

each connector including a post and a plurality of clasping members;

each clasping member being associated with one of the rails and fasteningly extending between the associated rail and the post;

each clasping member including a clip and a fastener;

the clip being engaged with the associated rail;

the fastener extending between the clip and the post;

the clip including a first engagement element, a second engagement element, and a third engagement element that are each engaged with the associated rail to retain the associated rail on the post;

wherein a portion of the clip that extends between at least a pair of the engagement elements is disposed at least partially adjacent the outward-facing surface of the associated rail; and the fastener being generally centrally disposed between the three engagement elements.

6. The cabinet frame as set forth in claim 5, in which each of the first, second, and third engagement elements includes an engagement surface; and in which the engagement surfaces of each clip together are oriented so as to be disposed at least partially in a pair of generally perpendicular planes.

7. The cabinet frame as set forth in claim 5, in which the fasteners are oriented oblique to the longitudinal extent of the rails;

whereby each clip applies to the associated rail in two substantially perpendicular directions forces transmitted to the clips from the fasteners.

8. The cabinet frame as set forth in claim 5, in which each rail includes a cavity extending substantially throughout the longitudinal extent of the rail; and in which the cavity is in communication with the exterior of the rail through an opening in the rail extending substantially throughout the longitudinal extent of the rail.

9. The cabinet frame as set forth in claim 8, in which each rail includes a first flange and a second flange that are oriented substantially parallel with one another; and in which a longitudinal edge of each of the first and second flanges is disposed adjacent the opening in the rail.

10. The cabinet frame as set forth in claim 9, in which the first and second flanges are each formed with an aperture that defines a seat;

in which each of the first, second, and third engagement elements includes an engagement surface; and in which the first and second engagement elements are at least partially received in the apertures with the engagement surfaces of the first and second engagement elements being engaged with the seats.

11. The cabinet frame as set forth in claim 10, in which each rail additionally includes a base, a first leg, and a second leg;

the first and second legs extending from the base;

the first flange extending from the first leg;

the second flange extending from the second leg;

the base being oriented substantially parallel with and spaced apart from the first and second flanges.

12. The cabinet frame as set forth in claim 11, in which the engagement surface of the third engagement element is engaged with the base generally opposite the opening in the rail.

13. The cabinet frame as set forth in claim 12, in which at least one of the rails additionally includes a third flange oriented substantially perpendicular to the first and second flanges and extending from the second flange along at least a portion of the longitudinal edge thereof that is disposed adjacent the opening in the rail.

14. The cabinet frame as set forth in claim 5, in which at least one of the rails includes a coating;

in which a point of juncture exists on the at least one rail at its region of contact with one of the posts; and in which a point of engagement exists on the at least one rail at each region of contact with one of the engagement members of one of the clips;

wherein the coating is at least partially ruptured on at least one of the point of juncture and at least one of the points of engagement as a result of engaging the at least one rail with the one of the posts.

15. A cabinet frame comprising:

a plurality of rails; and a plurality of connectors;

each rail including a first flange and a second flange oriented substantially parallel with one another and being separated from one another by an opening in the rail that extends substantially throughout the longitudinal extent of the rail;

each rail including a cavity extending substantially throughout the longitudinal extent of the rail and being in communication with the exterior of the rail through the opening in the rail;

each connector including a post and a plurality of clasping members;

each clasping member being associated with one of the rails fasteningly extending between the associated rail and the post; and each clasping member including a clip and a fastener;

the clip being engaged with the associated rail;

the fastener extending between the clip and the post;

the clip including a first engagement element, a second engagement element, and a third engagement element that are each engaged with the associated rail to retain the associated rail on the post;

the first engagement element being engaged with the first flange; and the second engagement element being engaged with the second flange.

16. The cabinet frame as set forth in claim 15, in which at least one of the first and second flanges includes a plurality of holes formed therein;

the holes being spaced along substantially the longitudinal extent of the at least one of the first and second flanges; and in which at least three of the width of the first flange, the width of the second flange, the width of the cavity, the height of the cavity, the width of the opening, and the spacing between adjacent holes are substantially equal to a multiple of a single characteristic length.

17. The cabinet frame as set forth in claim 15, in which each rail additionally includes a base, a first leg, and a second leg;

the first and second legs extending from the base;

the first flange extending from the first leg;

the second flange extending from the second leg the base being oriented substantially parallel with and spaced apart from the first and second flanges; and in which the third engagement element is engaged with the base generally opposite the opening in the rail.

18. The cabinet frame as set forth in claim 17, in which at least one of the rails includes an auxiliary flange member attached thereto;

the auxiliary flange member including a first plate and a second plate that are oriented substantially perpendicular to one another;

the first plate being mounted on one of the first flange, the second flange, the first leg, and the second leg.

19. The cabinet frame as set forth in claim 15, in which at least one of the rails additionally includes a third flange extending from the second flange and oriented substantially perpendicular to the first and second flanges;

the third flange being disposed adjacent the opening in the rail.

20. The cabinet frame as set forth in claim 15, in which at least one of the rails includes a coating;

in which a point of juncture exists on the at least one rail at its region of contact with one of the posts;

and in which a point of engagement exists on the at least one rail at each region of contact with one of the engagement members of one of the clips;

wherein the coating is at least partially ruptured on at least one of the point of juncture and at least one of the points of engagement as a result of engaging the at least one rail with the one of the posts.

* * * * *